US011212177B2

(12) United States Patent
Townend et al.

(10) Patent No.: US 11,212,177 B2
(45) Date of Patent: Dec. 28, 2021

(54) HOSTED PHYSICAL LAYER MANAGEMENT OR AUTOMATED INFRASTRUCTURE MANAGEMENT SYSTEM HAVING SOFTWARE ONLY CONFIGURATION AND/OR LOCAL HARDWARE APPLIANCE

(71) Applicant: CommScope Connectivity UK Limited, London (GB)

(72) Inventors: Kevin David Townend, Flintshire (GB); Andrew P. Roberts, Wales (GB); Alexander Thomas, Wales (GB)

(73) Assignee: CommScope Connectivity UK Limited, London (GB)

(*) Notice: Subject to any disclaimer, the term of this patent is extended or adjusted under 35 U.S.C. 154(b) by 832 days.

(21) Appl. No.: 14/341,008

(22) Filed: Jul. 25, 2014

(65) Prior Publication Data
US 2015/0039739 A1    Feb. 5, 2015

Related U.S. Application Data

(60) Provisional application No. 61/861,077, filed on Aug. 1, 2013.

(51) Int. Cl.
*H04L 12/24* (2006.01)
*H04Q 1/02* (2006.01)
*H04L 29/08* (2006.01)

(52) U.S. Cl.
CPC .......... *H04L 41/0853* (2013.01); *H04L 41/08* (2013.01); *H04L 67/20* (2013.01);
(Continued)

(58) Field of Classification Search
CPC ..... H04L 41/0853; H04L 41/08; H04L 67/20; H04L 41/5096; H04L 67/1002; H04Q 1/138
See application file for complete search history.

(56) References Cited

U.S. PATENT DOCUMENTS

| 8,832,503 B2 * | 9/2014 | Anne .................... H04L 41/12 714/43 |
| 2004/0064349 A1 * | 4/2004 | Humenansky ......... G06Q 10/06 703/22 |

(Continued)

FOREIGN PATENT DOCUMENTS

EP           1734692       12/2006

OTHER PUBLICATIONS

International Searcing Authority, "International Search Report and Written Opinon from PCT Application No. PCT/EP2014/066429 dated Oct. 30, 2014", "from Foreign Counterpart of U.S. Appl. No. 14/341,008", dated Oct. 30, 2014, pp. 1-13, Published in: WO.

(Continued)

*Primary Examiner* — Oanh Duong
(74) *Attorney, Agent, or Firm* — Fogg & Powers LLC

(57) ABSTRACT

One embodiment is directed to a "software only" hosted or cloud-based physical layer management (PLM) system. Another embodiment is directed to a hosted or cloud-based PLM system or Automated Infrastructure Management (AIM) system that uses a hardware appliance that is locally deployed in an enterprises network. Other embodiments are disclosed.

22 Claims, 3 Drawing Sheets

(52) U.S. Cl.
CPC ......... *H04Q 1/138* (2013.01); *H04L 41/5096* (2013.01); *H04L 67/1002* (2013.01)

(56) References Cited

U.S. PATENT DOCUMENTS

| | | | |
|---|---|---|---|
| 2005/0108370 A1 | 5/2005 | Sarraf et al. | |
| 2006/0117146 A1* | 6/2006 | Clisby | G06F 12/084 711/141 |
| 2007/0238343 A1* | 10/2007 | Velleca | H01R 9/2475 439/188 |
| 2009/0322487 A1 | 12/2009 | Lange et al. | |
| 2010/0165980 A1 | 7/2010 | Sargor et al. | |
| 2010/0211664 A1 | 8/2010 | Raza et al. | |
| 2010/0211665 A1 | 8/2010 | Raza et al. | |
| 2011/0097925 A1* | 4/2011 | Caveney | H04Q 1/149 439/488 |
| 2011/0289134 A1* | 11/2011 | de los Reyes | H04L 63/20 709/203 |
| 2011/0302194 A1* | 12/2011 | Gonzalez | G06F 17/30241 707/769 |
| 2013/0318152 A1* | 11/2013 | Iyer | G06F 9/541 709/203 |
| 2013/0318207 A1* | 11/2013 | Dotter | H04L 29/08117 709/219 |
| 2014/0016505 A1* | 1/2014 | Smith | H04L 41/022 370/254 |
| 2014/0016527 A1* | 1/2014 | Coffey | H04L 41/50 370/310 |
| 2014/0019662 A1* | 1/2014 | Coffey | A47B 91/005 710/306 |

OTHER PUBLICATIONS

European Patent Office, "Communication pursuant to Article 94(3) from EP Application No. 14747601.4 dated May 3, 2019", from Foreign Counterpart to U.S. Appl. No. 14/341,008, pp. 1-5, Published: EP.

Korean Intellectual Property Office, "International Search Report and Written Opinion", "from Foreign Counterpart of U.S. Appl. No. 13/939,805", dated Oct. 31, 2013, pp. 1-13, Published in: KR.

* cited by examiner

HOSTED PHYSICAL LAYER MANAGEMENT OR AUTOMATED INFRASTRUCTURE MANAGEMENT SYSTEM HAVING SOFTWARE ONLY CONFIGURATION AND/OR LOCAL HARDWARE APPLIANCE

CROSS-REFERENCE TO RELATED APPLICATION

This application claims the benefit of U.S. Provisional Patent Application Ser. No. 61/861,077, filed on Aug. 1, 2013, which is hereby incorporated herein by reference.

BACKGROUND

Various types of physical layer management (PLM) technology can be used to track connections made at patch panels or other cross- or inter-connection devices. Generally, such PLM technology includes functionality to obtain information about what is connected to each service port of a patch panel or other cross- or inter-connection device and to communicate that information back to a management application. The management application stores the information and makes it available for various purposes (such as tracing connections and carrying out electronic work orders that specify how one or more connections are to be moved, added, or otherwise changed).

One type of PLM technology makes use of an Electrically Erasable Programmable Read-Only Memory (EEPROM) or other storage device that is integrated with or attached to a connector on a cable. The storage device is used to store information about the connector or cable along with other information. The port (or other connector) into which the associated connector is inserted is configured to read the information stored in the EEPROM when the connector is inserted into the port.

Another type of PLM technology makes use of so-called "ninth wire" technology. Ninth wire technology makes use of special cables that include an extra conductor or signal path (also referred to here as the "ninth wire") that is used for determining which port each end of the cable is inserted into.

Yet another type of PLM technology makes use of radio frequency identification (RFID) tags and readers. With RFID technology, an RFID tag is attached to or integrated with a connector on a cable. The RFID tag is used to store information about the connector or cable along with other information. The RFID tag can be read after the associated connector is inserted into a corresponding jack or other port using an RFID reader.

Another type of PLM technology infers connection information by sensing when connectors are inserted and removed from ports of the various devices.

The management application that stores data obtained using such PLM technology is typically locally hosted by each individual enterprise that has deployed the PLM technology. However, some enterprises may not have the resources or the desire to locally host such a management application.

SUMMARY

One embodiment is directed to a server system comprising one or more server computers operated by a third party. The one or more server computers are configured to execute a respective management application for each of a plurality of networks as a hosted service. Each of the plurality of networks is operated by a different enterprise. The hosted management application for each of the plurality of networks is configured to include a documentation function to document connections made using cables in the respective network and a workflow management function to direct a technician in moving, adding, or changing connections made using cables in the respective network. The hosted management application for at least one of the plurality of networks is configured to support a software only configuration in which the documentation and workflow management functions included in that hosted management application are accessed by entities associated with the respective network only using client software executing on one or more client devices associated with the respective network.

Another embodiment is directed to a method comprising executing a respective management application for each of a plurality of networks as a hosted service on one or more servers computers maintained by a third party. Each of the plurality of networks is operated by a different enterprise. The hosted management application for each of the plurality of networks is configured to include a documentation function to document connections made using cables in the respective network and a workflow management function to direct a technician in moving, adding, or changing connections made using cables in the respective network. The method further comprises configuring the hosted management application for at least one of the plurality of networks to support a software only configuration in which the documentation and workflow management functions included in that hosted management application are accessed by entities associated with the respective network only using client software executing on one or more client devices associated with the respective network.

Another embodiment is directed to a system comprising one or more server computers operated by a third party. The one or more server computers are configured to aggregate physical layer information about each of a plurality of networks as a hosted service. Each of the plurality of networks is operated by a different enterprise. The system further comprises devices deployed in a first network included in the plurality of networks, the devices comprising physical layer information data acquisition technology to automatically capture physical layer information about cables used to make connections using the devices. The system further comprises an appliance deployed in the first network that is configured to run a local agent that receives physical layer information acquired using the physical layer information data acquisition technology in the devices of the first network and communicates at least some of the received physical layer information to the hosted management application for the first network.

Another embodiment is directed to an appliance for use in a network maintained by an enterprise, the appliance comprising a programmable processor configured to execute software and a network interface configured to communicate over the network with devices included in the network that include physical layer information data acquisition technology to automatically capture physical layer information about cables used to make connections at the devices. The network interface is further configured to communicate with a hosted management application associated with the network that is running on one or more servers maintained by a third party. The one or more servers are not a part of the network maintained by the enterprise. The software is configured to cause the appliance to receive at least some physical layer information acquired by the physical layer information data acquisition technology included in the devices and to communicate at least some of the received physical layer information to the hosted management application associated with the network.

DRAWINGS

DETAILED DESCRIPTION

U.S. patent application Ser. No. 13/939,805, filed on Jul. 11, 2013, and entitled "HETEROGENEOUS AND/OR HOSTED PHYSICAL LAYER MANAGEMENT SYSTEM" (which is incorporated herein by reference and which is also referred to here as the "'805 Application") describes a hosted physical layer management (PLM) system in which a third party hosts a PLM management application for each of multiple, unrelated enterprises. In the embodiment described in the '805 application, each such enterprise implements in its network at least one type of physical layer information acquisition technology for automatically obtaining physical layer information. As used herein, "physical layer information" includes information about cabling and devices that are used to implement the communication links that exist in a network. Examples of such physical layer information acquisition technology include EEPROM-based PLM technology, RFID PLM technology, ninth wire PLM technology, and inference-based PLM technology.

Figure 1:
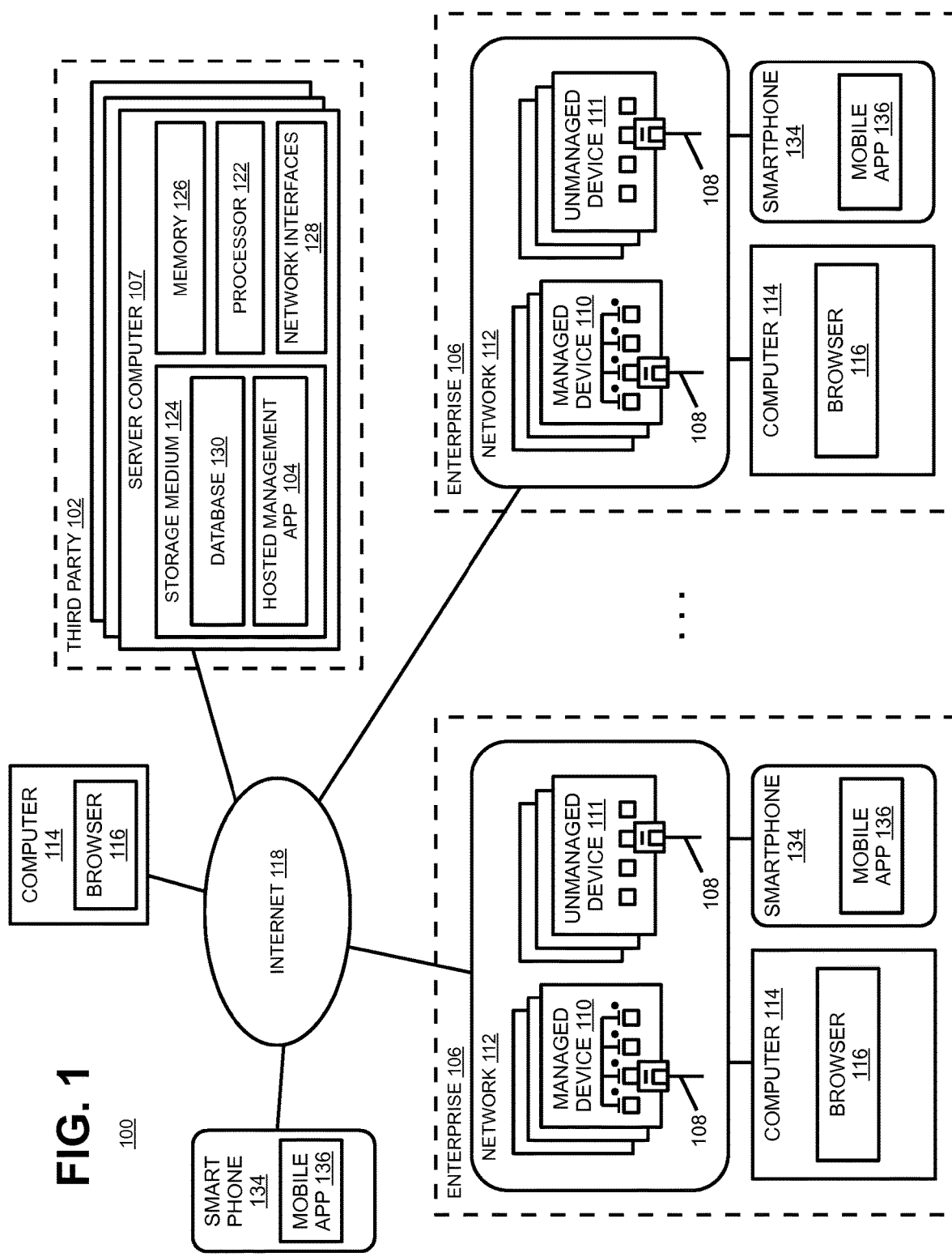
FIG. 1 is a block diagram of one exemplary embodiment of a system in which a third party hosts management applications for multiple enterprises on server computers maintained by the third party where the hosted management application for at least one of the networks is configured to support a "software only" configuration.

However, some enterprises may wish to use the functionality of the PLM management application to document the cabling and devices used to implement their networks and/or to manage the workflow of technicians that move, add, and otherwise change connections in their networks but are unable or unwilling to implement the physical layer information acquisition technology that is compatible with the PLM management application. For example, the enterprise's network may be implemented using proprietary or legacy physical layer information acquisition technology that is not configured to communicate with the desired PLM management application or the enterprise's network may be implemented using devices that do not include any physical layer information acquisition technology at all. FIG. 1 illustrates an exemplary embodiment of a system 100 that is configured to address such a usage scenario.

FIG. 1 is a block diagram of one exemplary embodiment of a system 100 in which a third party 102 hosts management applications 104 for multiple enterprises (for example, businesses, government organizations, schools, and other for-profit and non-profit organizations) 106 on server computers 107 maintained by the third party 102.

The "third party" referred to here can be a vendor of the management application 104 and/or related PLM hardware and/or can be a general hosted services provider (such as AMAZON).

In the exemplary embodiment shown in FIG. 1, each enterprise's network 112 is implemented using various unmanaged devices 111 and/or legacy or proprietary managed devices 110. As used herein, a "managed" device 110 is a device 110 that includes some type of physical layer information data acquisition technology for automatically obtaining physical layer information related to cabling 108 that is attached to that device 110. Examples of managed devices 110 include patch panels, optical distribution frames, splitter trays, switches, routers, etc., that include one or more of EEPROM-based PLM technology, RFID PLM technology, ninth wire PLM technology, and inference-based PLM technology. In this exemplary embodiment, the managed devices 110 used in each enterprise network 112 uses proprietary or legacy physical layer information acquisition technology that is not configured to communicate with (or is not otherwise compatible with) the hosted management application 104.

Also, as used herein, an "unmanaged" device 111 is a device 111 that does not include any type of physical layer information data acquisition technology for automatically obtaining physical layer information related to cabling 108 that is attached to that device 111.

Instead of having each enterprise 106 deploy and maintain locally within the enterprise 106 its own management application for documenting the cabling 108 and devices 110 and 111 used to implement that enterprise's network 112 and/or to manage the workflow of technicians that move, add, and otherwise change connections in the network 112, a respective management application 104 for each enterprise 106 is hosted on the server computers 107 that are maintained by the third party 102.

In the exemplary embodiment shown in FIG. 1, each hosted management application 104 is implemented as software that executes on one or more of the server computers 107 maintained by the third party 102. Each hosted management application 104 implements one or more documentation functions for documenting the cabling 108 and devices 110 and 111 used to implement that enterprise's network 112, one or more workflow management functions for managing the workflow of technicians that move, add, and otherwise change connections in the network 112, a web server for serving web pages and web applications, and one or more web services interfaces (for example, interfaces that implement the Simple Object Access Protocol (SOAP) and/or the Representational State Transfer (REST) software architectural style).

In the exemplary embodiment shown in FIG. 1, each server computer 107 comprises one or more programmable processors 122 for executing the software. The software comprises program instructions that are stored (or otherwise embodied) on or in an appropriate non-transitory storage medium or media 124 (such as flash or other non-volatile memory, magnetic disc drives, and/or optical disc drives) from which at least a portion of the program instructions are read by the programmable processor 122 for execution thereby. Although the storage media 124 is shown in FIG. 1 as being included in, and local to, the respective server computer 107, it is to be understood that remote storage media (for example, storage media that is accessible over a network) and/or removable media can also be used. Each server computer 107 also includes memory 126 for storing the program instructions (and any related data) during execution by the programmable processor 122. Memory 126 comprises, in one implementation, any suitable form of random access memory (RAM) now known or later developed, such as dynamic random access memory (DRAM). In other embodiments, other types of memory are used. Each server computer 107 also includes one or more network interfaces 128 for communicatively coupling the server computer 107 to a network (not shown) maintained by the third party 102 and, ultimately the Internet 118.

Each hosted management application 104 includes or is coupled to a database or other data store 130 for storing the physical layer information provided to it.

Although not illustrated in FIG. 1 for ease of illustration, virtualization technology can be (and typically would be) used to provide a separate virtualized server instance for each enterprise 106, where each such virtualized server instance is used to execute the management application 104 for that enterprise 106. Virtualized server instances for multiple enterprises 106 can be run by a single server computer 107. Sever load balancing techniques can be used to balance the load of hosting of the management applications 104 for all of the enterprises 106 using the server computers 107.

The hosted management application 104 for at least one enterprise's network 112 is used to implement a "software only" PLM system of which the management application 104 is the primary element. The PLM system is "software only" in the sense that all interaction with the management application 104—and the documentation and workflow management functionality provided thereby—occurs via software executing on a client device (such as a computer 114 or smartphone 134). For example, in this software only configuration, physical layer information acquisition technology of the type described above is not used to automatically capture physical layer information and provide it to a hosted management application 104 in connection with carrying out the documentation functions of the hosted management application 104. Instead, such information must be provided to the hosted management application 104 manually using the software clients described below. Also, in this software only configuration, the hosted management application 104 is not able to actuate light emitting diodes associated with devices 110 and 110 in an enterprise's network 112 in connection with carrying out the workflow management functions of the hosted management application 104. Instead, all such visual indications and assistance occurs via the software clients described below.

In the exemplary embodiment shown in FIG. 1, the hosted management application 104 for all of the enterprises' networks 112 are used to implement "software only" PLM systems, though is to be understood that all of the host management applications 104 need not be used in a software only configuration at the same time. That is, the hosted management application 104 for at least one network 112 can be configured to receive physical layer information about cables 108 used to make connections in that network 112 that is automatically captured using physical layer information data acquisition technology included in managed devices 110 in that network 112. The physical layer information data acquisition technology can be implemented, for example, using one or more of EEPROM-based technology, RFID technology, ninth wire technology, and inference-based technology. For example, an enterprise may execute a local agent within the enterprise's network 112 that is configured to appear and function, from the perspective of the managed devices 110 deployed in the enterprise's network 112, as a locally deployed management application (for example, to implement the discovery protocols that the managed devices 110 are configured to use for being discovered by a management application and for discovering a management application to be managed by) and/or that is configured to forward certain messages between the managed devices 110 and the hosted management application 104 (for example, messages sent from the managed devices 110 that include physical layer information obtained by the managed devices 110 or status and alarm information and messages sent from the corresponding hosted management application 104 requesting information from a managed device 110 or configuring a managed device 110). This local agent may be deployed on a server computer within the enterprise or using the appliance described below in connection with FIG. 2.

In the exemplary embodiment shown in FIG. 1 (where the hosted management application 104 for all of the enterprises' networks 112 are used to implement "software only" PLM systems), each enterprise 106 accesses its respective management application 104 via the Internet 118. For example, in this exemplary embodiment, the management application 104 for a given enterprise 102 can be accessed using a web browser 116 running on a client computer or other device 114. The management application 104 implements or is coupled to a web server that is configured to respond to requests from the web browser 116. The management application 104 is configured to serve appropriate web pages and/or web-based applications to the browser 116 that enable a user to enter, query, view, and modify physical layer information for the associated enterprise's network 112. For example, a user can use the web browser 116 to provide to the associated management application 104 information about unmanaged devices 111, legacy or proprietary managed devices 110, and cabling 108 that are used in the network 112. This can involve the user manually entering such information in a web form that is displayed in the browser 116. Also, this can involve providing an interface by which a user can upload a spreadsheet or other data file to the management application 104 in a format that the management application 104 is configured to parse and import. For example, such a spreadsheet or other data file can be produced by exporting physical layer information from a local management application or similar application that is used with the legacy or proprietary managed devices 110. Also, such a spreadsheet or other data file can be produced by exporting physical layer information from a network management system that is used for other network management purposes in the associated enterprise 106. Also, a user can manually prepare such a spreadsheet or data file and then upload the file using the web browser 116. Physical layer information can be supplied to the management application 104 in other ways.

In the exemplary embodiment shown in FIG. 1, the management application 104 is also configured to interact with a portable device 134. In this example, the portable device 134 is implemented using a smartphone (and is also referred to here as "smartphone" 134). However, the portable device 134 can be implemented in other ways (for example, using a portable computer).

In this example, the smartphone 134 is configured to execute a mobile application 136. The mobile application 136 is configured to communicate with the associated enterprise's management system 104 and to receive electronic work orders. The mobile application 136 comprises program instructions that are stored (or otherwise embodied) on or in an appropriate non-transitory storage medium or media from which at least a portion of the program instructions are read by at least one programmable processor included in the smartphone 134 for execution thereby.

The smartphone 134 also includes a touchscreen for displaying information for a user of the smartphone 134 and for receiving touch input from a user. The smartphone 134 also includes a camera for capturing images and/or video.

The smartphone 134 also includes one or more communication interfaces for communicating over a network 112 or the Internet 118. For example, the communication interfaces can include one or more wireless interfaces (for example, supporting one or more cellular, wireless wide area network, or wireless local area network protocols and standards) and/or one or more wired interfaces (for example, supporting one or more serial bus interfaces (such as one or more of the Universal Serial Bus (USB) family of standards and protocols) or wired local area network interfaces (such as one or more of the ETHERNET family of wired local area network standards and protocols)).

The smartphone 134 (and the mobile application 136 executing thereon) and the client computer 114 (and the web browser 116 executing thereon) can access the relevant hosted management 104 via the public Internet 118 (for example, where the smartphone 134 or client computer 114 accesses the Internet 118 and the hosted management application 104 via the enterprise's network 112 or via another connection (such as a public cellular connection) to the Internet 118).

Appropriate security measures can be taken to authenticate users and software that interact with the hosted management application 104 and to secure communications that occur between the hosted management application 104 and such software (including the mobile application 136 and browser 116). For example, the Secure Sockets Layer (SSL) protocol can be used to secure such communications.

In the example shown in FIG. 1, each hosted management application 104 is configured so as to enable electronic work orders to be constructed (for example, by accessing the management application 104 using a web browser 116) and communicated to smartphones 134. Each electronic work specifies one or more steps that are to be carried out by a technician at a particular location. For example, an electronic work order can indicate that one or more connections implemented using the ports of a device 110 or 111 should be added, removed, and/or changed. An electronic work order can also instruct the technician to enter or otherwise capture (for example, using a camera included in the smartphone 134) information about the network 112 (for example, the electronic work order can instruct the technician to enter information about or take a picture or video of a connection that the technician added, removed, or changed as a part of the electronic work order). That is, the smartphone 134 and the mobile application 136 executing thereon can be used both for documenting the devices 110 and 111 and cabling 108 used in the network 112 and for workflow management.

In this example, an electronic work order can be communicated to a smartphone 134 (or similar device) that is carried by a technician that has been assigned to carry out that electronic work order. Each electronic work order can be communicated wirelessly to the smartphone 134 over the Internet 118 (for example, via a cellular or wireless local area network to which the smartphone 134 is wirelessly connected). Each electronic work order can also be communicated to the smartphone 134 in other ways (for example, using a wired connection with the smartphone 134).

By hosting the management application 104 on servers 108 maintained by a third party 102, an enterprise 106 need not devote internal resources to doing so, which may be desirable for some enterprises. Furthermore, by using the management application 104 in a software only configuration, an enterprise 106 can use the functionality of the hosted management application 104 (for example, the documentation and workflow management functionality) even if the enterprise 106 has not implemented any physical layer information acquisition technology at all in its network 112 and/or has only implemented physical layer information acquisition technology that is incompatible with the hosted management application 104.

Figure 2:
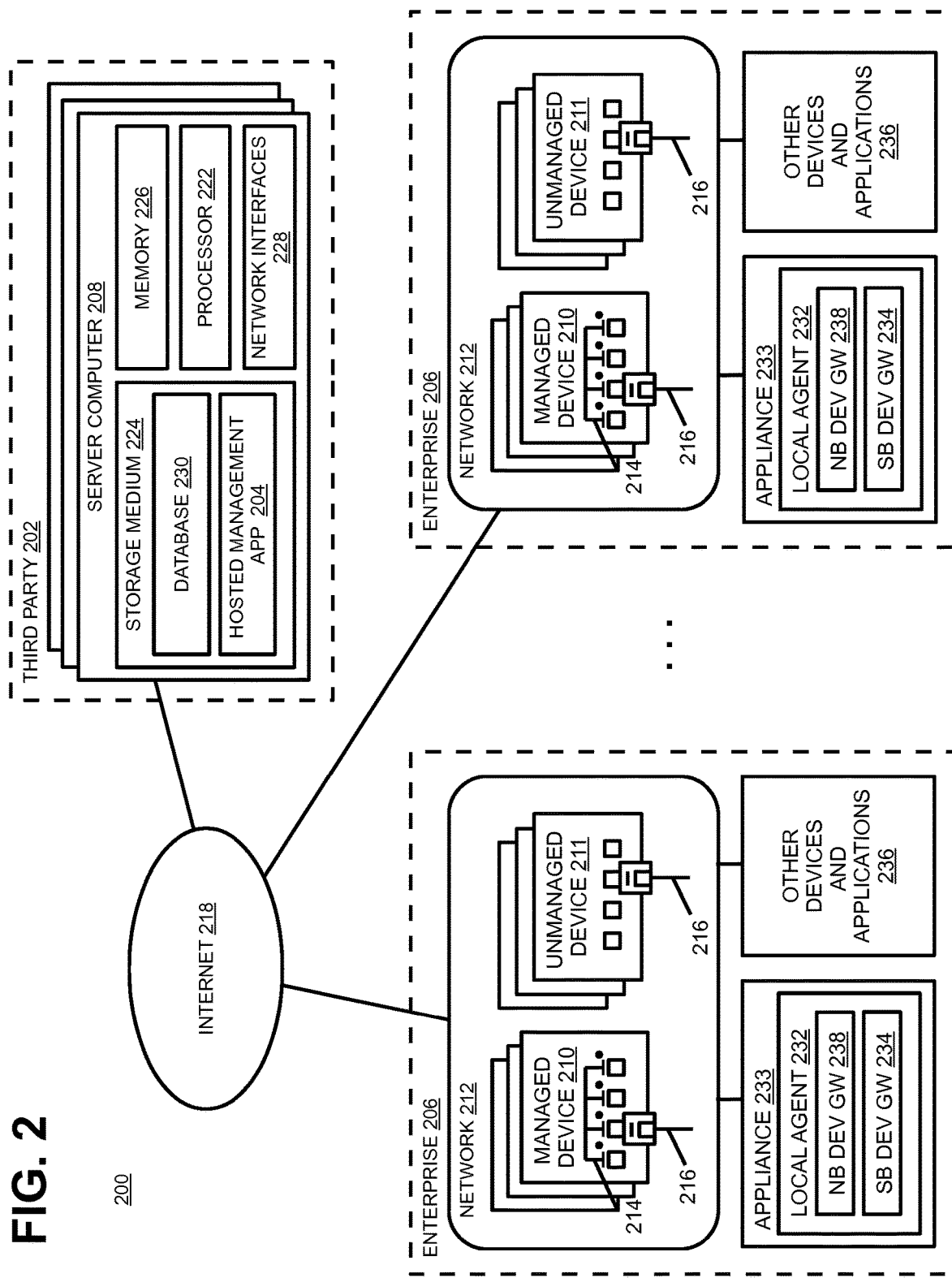
FIG. 2 is a block diagram of one exemplary embodiment of a system in which a third party hosts management applications for multiple enterprises on server computers maintained by the third party where an appliance is locally deployed in at least one of the enterprises.

In the embodiment described in the '805 application, each enterprise executes a local agent within the enterprise's network that is configured to appear and function, from the perspective of the managed devices deployed in the enterprise's network, as a locally deployed management application (for example, to implement the discovery protocols that the managed devices are configured to use for being discovered by a management application and for discovering a management application to be managed by) and/or that is configured to forward certain messages between the managed devices and the hosted management application (for example, messages sent from the managed devices that include physical layer information obtained by the managed devices or status and alarm information and messages sent from the corresponding hosted management application requesting information from a managed device or configuring a managed device). However, an enterprise that is interested in implementing a hosted management application solution may not want to devote the resources to install and maintain software that implements such a local agent on a regular server computer (or other computer). FIG. 2 illustrates an exemplary embodiment of a system 200 that is configured to address such a usage scenario.

FIG. 2 is a block diagram of one exemplary embodiment of a system 200 in which a third party 202 hosts management applications 204 for multiple enterprises 106 on server computers 208 maintained by the third party 202.

In the exemplary embodiment shown in FIG. 2, each of the multiple enterprises (for example, businesses, government organizations, schools, and other for-profit and non-profit organizations) 206 deploys managed devices 210 in a network 212 the enterprise 206 implements for use in that enterprise 206.

The managed devices 210 deployed in the network 212 of each enterprise 206 include some type of physical layer information data acquisition technology 214 for automatically obtaining physical layer information related to cabling 216 that is attached to the managed devices 210.

Instead of having each enterprise 206 deploy and maintain within the enterprise 206 its own management application for aggregating physical layer information obtained by the managed devices 210 in the enterprise's network 212, a respective management application 204 for each enterprise 206 is hosted on the server computers 208 that are maintained by the third party 202. Physical layer information obtained by the managed devices 210 deployed in the enterprise's network 212 is communicated to the respective management application 204 over the Internet 218, which aggregates the physical layer information for the devices 210 deployed in the associated enterprise's network 212.

In the exemplary embodiment shown in FIG. 2, each hosted management application 204 is implemented as software that executes on one or more of the server computers 208 maintained by the third party 202.

The "third party" referred to here can be a vendor of the management application 204 and/or related PLM hardware and/or can be a general hosted services provider (such as AMAZON).

In the exemplary embodiment shown in FIG. 2, each server computer 208 comprises one or more programmable processors 222 for executing the software. The software comprises program instructions that are stored (or otherwise embodied) on or in an appropriate non-transitory storage medium or media 224 (such as flash or other non-volatile memory, magnetic disc drives, and/or optical disc drives) from which at least a portion of the program instructions are read by the programmable processor 222 for execution thereby. Although the storage media 224 is shown in FIG. 2 as being included in, and local to, the respective server computer 208, it is to be understood that remote storage media (for example, storage media that is accessible over a network) and/or removable media can also be used. Each server computer 208 also includes memory 226 for storing the program instructions (and any related data) during execution by the programmable processor 222. Memory 226 comprises, in one implementation, any suitable form of random access memory (RAM) now known or later developed, such as dynamic random access memory (DRAM). In other embodiments, other types of memory are used. Each server computer 208 also includes one or more network interfaces 228 for communicatively coupling the server computer 208 to a network (not shown) maintained by the third party 202 and, ultimately the Internet 218.

Each hosted management application 204 includes or is coupled to a database or other data store 230 for storing the physical layer information provided to it.

Although not illustrated in FIG. 2 for ease of illustration, virtualization technology can be (and typically would be) used to provide a separate virtualized server instance for each enterprise 206, where each such virtualized server instance is used to execute the management application 204 for that enterprise 206. Virtualized server instances for multiple enterprises 206 can be run by a single server computer 208. Sever load balancing techniques can be used to balance the load of hosting of the management applications 204 for all of the enterprises 206 using the server computers 208.

In the exemplary embodiment shown in FIG. 2, each enterprise 206 deploys an appliance 233 within the enterprise's network 212. The appliance 233 is configured to execute a local agent 232. As used herein, an "appliance" refers to a hardware device that includes and executes integrated and embedded software or firmware that is specifically configured to carry out a specific computing task (that is, implementing the local agent 232 described below). The software or firmware that implements the local agent 232 is pre-installed on the hardware device, and the hardware device is configured as a "turn key" solution that can be easily deployed in a network 212 without significant configuration or maintenance by an end user.

Figure 3:
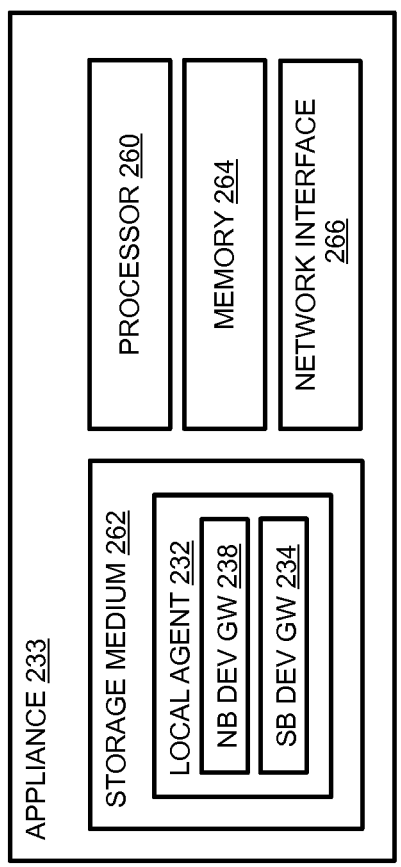
FIG. 3 is a block diagram of exemplary embodiment of the appliance shown in FIG. 2.

Additional details regarding the appliance 233 are shown in FIG. 3. As shown in FIG. 3, each appliance 233 comprises one or more programmable processors 260 for executing the software (including the local agent 232). The software comprises program instructions that are stored (or otherwise embodied) on or in an appropriate non-transitory storage medium or media 262 (such as flash or other non-volatile memory, magnetic disc drives, and/or optical disc drives) from which at least a portion of the program instructions are read by the programmable processor 260 for execution thereby. Although the storage media 262 is shown in FIG. 2 as being included in, and local to, the respective appliance 233, it is to be understood that remote storage media (for example, storage media that is accessible over a network) and/or removable media can also be used. Each appliance 233 also includes memory 264 for storing the program instructions (and any related data) during execution by the programmable processor 260. Memory 264 comprises, in one implementation, any suitable form of random access memory (RAM) now known or later developed, such as dynamic random access memory (DRAM). In other embodiments, other types of memory are used. Each appliance 233 also includes one or more network interfaces 266 for communicatively coupling the appliance 233 to an enterprise's network 212 and, ultimately the Internet 218.

The local agent 232 is configured to implement a southbound interface gateway 234 between the managed devices 210 in each enterprise's network 212 and the hosted management application 204 deployed on the server computers 208 of the third party 202. The southbound interface gateway 234 in each local agent 232 is configured to appear and function, from the perspective of the managed devices 210 deployed in the enterprise's network 212, as a locally deployed management application. For example, the southbound interface gateway 234 can be configured to implement the discovery protocols that the managed devices 210 are configured to use for being discovered by a management application and for discovering a management application to be managed by. Also, the southbound interface gateway 234 can be configured to forward certain messages between the managed devices 210 and the hosted management application 204 deployed on the server computers 208 of the third party 202 (for example, messages sent from the managed devices 210 that include physical layer information obtained by the managed devices 210 or status and alarm information and messages sent from the corresponding hosted management application 204 requesting information from a managed device 210 or configuring a managed device 210).

In this way, a hosted management application 204 can be used even if the managed devices 210 deployed by the enterprise 206 do not natively support interacting with a hosted management application 204. This is beneficial because an enterprise 206 may have already invested in a large number of such managed devices 210 at the time the enterprise 206 wishes to switch to using a hosted management application 204 and upgrading or replacing such devices 210 all at one time may be difficult or costly.

In the exemplary embodiment shown in FIG. 2, other devices and applications 236 in each enterprise 206 access the physical layer information maintained by the hosted management application 204 for that enterprise 206. These other devices and applications 236 are also referred to here as the "other entities 236". This access can include retrieving information from the respective hosted management application 204 as well as supplying information to that hosted management application 204.

In this example, the local agent 232 deployed in each enterprise 206 also implements a northbound interface gateway 238 between the other entities 236 in each enterprise's network 212 and the hosted management application 204 deployed on the server computers 208 of the third party 202. The northbound interface gateway 238 in each local agent 232 is configured to appear and function, from the perspective of the other entities 236 deployed in the enterprise's network 212, as a locally deployed management application. For example, the northbound interface gateway 238 can be configured to implement the discovery protocols that the other entities 236 are configured to use for being discovered by a management application and for discovering a management application to interact with. Also, the northbound interface gateway 238 can be configured to forward certain messages between the other entities 236 and the hosted management application 204 deployed on the server computers 208 of the third party 202 (for example, messages sent from the other entities 236 requesting physical layer information stored in the database 230 and messages sent from the corresponding hosted management application 204 providing the requested information).

Each local agent 232 can be configured to interact with the respective hosted management application 204 by initiating an HTTP session with the hosted management application 204. Each such HTTP session can then be used for bi-directional communications between that local agent 232 and the hosted management application 204. In this way, any firewalls that exist between local agent 232 and the hosted management application 204 can be traversed without specially configuring the firewalls since firewalls are commonly configured to permit HTTP sessions to between established between entities within an enterprise network and an external server. Other firewall circumvention techniques can be used, as well as configuring the relevant firewalls to open ports for such communications.

Each appliance 233 can also be used to aggregate other types of information for forwarding to the hosted management application 204. For example, the software executing on each appliance 233 can be configured to obtain information about power usage, temperature (or other environmental conditions), and switches or sensors associated with the network 212 and the devices used to implement it.

In the exemplary embodiment shown in FIG. 2, some of the managed devices 210 and the other entities 236 are configured to communicate directly with the hosted management application 204 and do not need to interact via the local agent 232 and the appliance 233.

Also, each hosted management application 204 can be used to track information about one or more unmanaged devices 211 included in the associated enterprise's network 212 (for example, by having someone use a browser-based interface implemented by the hosted management application 204 to manually enter information about the unmanaged devices 211 and the cabling 216 attached thereto).

An enterprise 206 can use a combination of locally deployed management applications and hosted management applications 204.

Also, although only a single local agent 232 is shown in FIG. 2, it is to be understood that multiple local agents 232 can be used in a given enterprise's network 212 and that the southbound device gateway 238 and the northbound device gateway 240 need not be implemented on the same appliance 233.

Moreover, the hosted management applications 204 can be configured to interact with web browsers and smartphones or other portable devices as described above in connection with FIG. 1 (for example, for interacting with documentation and/or workflow management functions implemented by the hosted management applications 204).

By hosting the management application 204 on servers 208 maintained by a third party 202, an enterprise 206 need not devote internal resources to doing so, which may be desirable for some enterprises. Also, by using an appliance 233 to deploy the local agent 232, an enterprise 206 need not devote resources to install and maintain software that implements such a local agent on a regular server computer (or other computer).

The techniques described here can also be used with Automated Infrastructure Management (AIM) systems and technology, as well as PLM systems and technology.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

EXAMPLE EMBODIMENTS

Example 1 includes a server system comprising: one or more server computers operated by a third party; wherein the one or more server computers are configured to execute a respective management application for each of a plurality of networks as a hosted service, wherein each of the plurality of networks is operated by a different enterprise; wherein the hosted management application for each of the plurality of networks is configured to include a documentation function to document connections made using cables in the respective network and a workflow management function to direct a technician in moving, adding, or changing connections made using cables in the respective network; and wherein the hosted management application for at least one of the plurality of networks is configured to support a software only configuration in which the documentation and workflow management functions included in that hosted management application are accessed by entities associated with the respective network only using client software executing on one or more client devices associated with the respective network.

Example 2 includes the server system of Example 1, wherein the hosted management application for the at least one of the plurality of networks that is configured to support the software only configuration is configured to be accessed using client software that comprises at least one of: a web browser running a computer that interacts with a web server associated with that hosted management application; a mobile application executing on a smartphone or other portable device; and an application that interacts with the hosted management application for the at least one of the plurality of networks using a web services interface.

Example 3 includes any of the server systems of Examples 1-2, wherein the hosted management application for each of the plurality of networks comprises a respective one or more instances of the hosted management application executed on one or more of the server computers.

Example 4 includes any of the server systems of Examples 1-3, wherein the hosted management application for at least one of the plurality of networks is configured to receive physical layer information about cables used to make connections in that network that is automatically captured using physical layer information data acquisition technology included in devices of that network.

Example 5 includes the server system of Example 4, wherein the physical layer information data acquisition technology comprises one or more of EEPROM-based technology, RFID technology, ninth wire technology, and inference-based technology.

Example 6 includes a method comprising: executing a respective management application for each of a plurality of networks as a hosted service on one or more servers computers maintained by a third party, wherein each of the plurality of networks is operated by a different enterprise; wherein the hosted management application for each of the plurality of networks is configured to include a documentation function to document connections made using cables in the respective network and a workflow management function to direct a technician in moving, adding, or changing connections made using cables in the respective network; wherein the method further comprises configuring the hosted management application for at least one of the plurality of networks to support a software only configuration in which the documentation and workflow management functions included in that hosted management application are accessed by entities associated with the respective network only using client software executing on one or more client devices associated with the respective network.

Example 7 includes the method of Example 6, wherein the hosted management application for the at least one of the plurality of networks that is configured to support the software only configuration is configured to be accessed using client software that comprises at least one of: a web browser running a computer that interacts with a web server associated with that hosted management application; a mobile application executing on a smartphone or other portable device; and an application that interacts with the hosted management application for the at least one of the plurality of networks using a web services interface.

Example 8 includes any of the methods of Example 6-7, wherein executing the respective management application for each of the plurality of networks as a hosted service on one or more servers computers maintained by the third party comprises executing a respective one or more instances of the hosted management application for each of the plurality of networks as a hosted service on the one or more servers computers.

Example 9 includes any of the methods of Examples 6-8, further comprising: receiving, at the respective hosted management application for at least one of the plurality of networks, physical layer information about cables used to make connections in that network that is automatically captured using physical layer information data acquisition technology included in devices of that network.

Example 10 includes the method of Example 9, wherein the physical layer information data acquisition technology comprises one or more of EEPROM-based technology, RFID technology, ninth wire technology, and inference-based technology.

Example 11 includes a system comprising: one or more server computers operated by a third party, wherein the one or more server computers are configured to aggregate physical layer information about each of a plurality of networks as a hosted service, wherein each of the plurality of networks is operated by a different enterprise; devices deployed in a first network included in the plurality of networks, the devices comprising physical layer information data acquisition technology to automatically capture physical layer information about cables used to make connections using the devices; and an appliance deployed in the first network that is configured to run a local agent that receives physical layer information acquired using the physical layer information data acquisition technology in the devices of the first network and communicates at least some of the received physical layer information to the hosted management application for the first network.

Example 12 includes the system of Example 11, wherein the physical layer information data acquisition technology comprises one or more of EEPROM-based technology, RFID technology, ninth wire technology, and inference-based technology.

Example 13 includes any of the systems of Examples 11-12, wherein one or more appliances are installed in the first network, each of the one or more appliances running a respective local agent that communicates physical layer information acquired for the first network using the physical layer information data acquisition technology to the hosted management application associated with the first network.

Example 14 includes any of the systems of Examples 11-13, wherein the hosted management application for more than one network included in the plurality of networks is configured to receive physical layer information about cables used to make connections in said more than one networks that is automatically captured using physical layer information data acquisition technology included in devices included in said more than one networks; and wherein, for each of said more than one networks, a respective appliance is installed within that network that runs a local agent that communicates physical layer information acquired for that network using the physical layer information data acquisition technology to the hosted management application associated with that network.

Example 15 includes any of the systems of Examples 11-14, wherein the local agent running on the appliance implements a first interface to communicate with the hosted management application associated with the first network and a second interface to receive physical layer information acquired for the first network using the physical layer information data acquisition technology included in devices of the first network.

Example 16 includes any of the systems of Examples 11-15, wherein the local agent running on the appliance is configured to automatically discover devices in the first network that include physical layer information data acquisition technology.

Example 17 includes any of the systems of Examples 11-16, wherein the local agent running on the appliance is configured to automatically discover the hosted management application associated with the first network.

Example 18 includes an appliance for use in a network maintained by an enterprise, the appliance comprising: a programmable processor configured to execute software; and a network interface configured to communicate over the network with devices included in the network that include physical layer information data acquisition technology to automatically capture physical layer information about cables used to make connections at the devices, the network interface further configured to communicate with a hosted management application associated with the network that is running on one or more servers maintained by a third party, the one or more servers not being a part of the network maintained by the enterprise; wherein the software is configured to cause the appliance to receive at least some physical layer information acquired by the physical layer information data acquisition technology included in the devices and to communicate at least some of the received physical layer information to the hosted management application associated with the network.

Example 19 includes the appliance of Example 18, wherein the physical layer information data acquisition technology comprises one or more of EEPROM-based technology, RFID technology, ninth wire technology, and inference-based technology.

Example 20 includes any of the appliances of Examples 18-19, wherein the software implements a first interface to communicate with the hosted management application associated with the network and a second interface to receive at least some physical layer information acquired by the physical layer information data acquisition technology included in the devices.

Example 21 includes any of the appliances of Examples 18-20, wherein the software is configured to automatically discover devices in the network that include physical layer information data acquisition technology.

Example 22 includes any of the appliances of Examples 18-21, wherein the software is configured to automatically discover the hosted management application associated with the network.

What is claimed is:

1. A server system comprising:
   one or more server computers operated by a third party;
   wherein the one or more server computers are configured to execute a respective hosted management application for each respective network of a plurality of networks as a hosted service, wherein each respective network of the plurality of networks is operated by a different respective enterprise of a plurality of enterprises, wherein each respective network of the plurality of networks is distinct from a network that includes the one or more server computers;
   wherein the respective hosted management application for each respective network of the plurality of networks is configured to include a documentation function to document connections to one or more devices in the respective network made using cables in the respective network and a workflow management function to direct a technician in moving, adding, or changing connections made using cables in the respective network, wherein the one or more devices in a first network of the plurality of networks include a managed device that includes a physical layer information acquisition technology for automatically obtaining physical layer information related to cabling that is attached to the managed device; and
   wherein the respective hosted management application for the first network of the plurality of networks is configured to support a software only configuration in which all interaction with the documentation function and the workflow management function included in the respective hosted management application by entities associated with the first network occurs only using client software executing on one or more client devices associated with the first network, wherein physical layer information related to cabling that is attached to the managed device of the first network is provided to the documentation function using the client software executing on one or more client devices associated with the first network.

2. The server system of claim 1, wherein the respective hosted management application for the first network of the plurality of networks that is configured to support the software only configuration is configured to be accessed using client software that comprises at least one of:
   a web browser running on a computer that interacts with a web server associated with the respective hosted management application for the first network of the plurality of networks;
   a mobile application executing on a smartphone or other portable device; and
   an application that interacts with the respective hosted management application for the first network of the plurality of networks using a web services interface.

3. The server system of claim 1, wherein the respective hosted management application for each respective network of the plurality of networks comprises a respective one or more instances of the respective hosted management application executed on one or more of the server computers.

4. The server system of claim 1, wherein the respective hosted management application for at least one respective network of the plurality of networks is configured to receive physical layer information about cables used to make connections in the respective network that is automatically captured using physical layer information data acquisition technology included in devices of the respective network.

5. The server system of claim 4, wherein the physical layer information data acquisition technology comprises one or more of EEPROM-based technology, RFID technology, ninth wire technology, and inference-based technology.

6. A method comprising:
   executing a respective hosted management application for each respective network of a plurality of networks as a hosted service on one or more server computers maintained by a third party, wherein each respective network of the plurality of networks is operated by a different enterprise of a plurality of enterprises, wherein each respective network of the plurality of networks is distinct from a network that includes the one or more server computers;
   wherein the respective hosted management application for each respective network of the plurality of networks is configured to include a documentation function to document connections to one or more devices in the respective network made using cables in the respective network and a workflow management function to direct a technician in moving, adding, or changing connections made using cables in the respective network, wherein the one or more devices in a first network of the plurality of networks include a managed device that includes a physical layer information acquisition technology for automatically obtaining physical layer information related to cabling that is attached to the managed device;
   wherein the method further comprises configuring the respective hosted management application for the first network of the plurality of networks to support a software only configuration in which all interaction with the documentation and workflow management functions included in the respective hosted management application by entities associated with the first network occurs only using client software executing on one or more client devices associated with the first network, wherein physical layer information related to cabling that is attached to the managed device of the first network is provided to the documentation function using the client software executing on one or more client devices associated with the first network.

7. The method of claim 6, wherein the respective hosted management application for the first network of the plurality of networks that is configured to support the software only configuration is configured to be accessed using client software that comprises at least one of:
   a web browser running on a computer that interacts with a web server associated with the respective hosted management application for the first network of the plurality of networks;
   a mobile application executing on a smartphone or other portable device; and
   an application that interacts with the respective hosted management application for the first network of the plurality of networks using a web services interface.

8. The method of claim 6, wherein executing the respective management application for each respective network of the plurality of networks as a hosted service on one or more server computers maintained by the third party comprises executing a respective one or more instances of the respective hosted management application for each respective network of the plurality of networks as a hosted service on the one or more server computers.

9. The method of claim 6, further comprising: receiving, at the respective hosted management application for at least one respective network of the plurality of networks, physical layer information about cables used to make connections in the respective network that is automatically captured using physical layer information data acquisition technology included in devices of the respective network.

10. The method of claim 9, wherein the physical layer information data acquisition technology comprises one or more of EEPROM-based technology, RFID technology, ninth wire technology, and inference-based technology.

11. A system comprising:
one or more server computers operated by a third party, wherein the one or more server computers are configured to aggregate physical layer information about each respective network of a plurality of networks as a hosted service, wherein each respective network of the plurality of networks is operated by a different respective enterprise of a plurality of enterprises;
devices deployed in a first network included in the plurality of networks, the devices comprising physical layer information data acquisition technology to automatically capture physical layer information about cables used to make connections using the devices; and
an appliance deployed in the first network, wherein the appliance is a distinct component from the devices deployed in the first network and communicatively coupled to the devices deployed in the first network, wherein the appliance is configured to run a local agent configured to receive physical layer information from the devices deployed in the first network, wherein the physical layer information is acquired using the physical layer information data acquisition technology in the devices deployed in the first network, wherein the appliance is further configured to communicate at least some of the received physical layer information from the devices deployed in the first network to a hosted management application for the first network, wherein the hosted management application is hosted on the one or more server computers operated by the third party in a network distinct from the first network, wherein the appliance is configured to appear and function, from the perspective of the devices deployed in the first network, as a management application that is locally deployed in the first network.

12. The system of claim 11, wherein the physical layer information data acquisition technology comprises one or more of EEPROM-based technology, RFID technology, ninth wire technology, and inference-based technology.

13. The system of claim 11, wherein one or more appliances are installed in the first network, each of the one or more appliances running a respective local agent configured to communicate physical layer information from the devices deployed in the first network to the hosted management application for the first network.

14. The system of claim 11, wherein a hosted management application for more than one network included in the plurality of networks is configured to receive physical layer information about cables used to make connections in said more than one network that is automatically captured using physical layer information data acquisition technology included in devices included in said more than one network; and
wherein, for each respective network of said more than one network, a respective appliance is installed within the respective network that runs a local agent that communicates physical layer information from the devices deployed in the respective network to a hosted management application associated with the respective network.

15. The system of claim 11, wherein the local agent running on the appliance implements a first interface to communicate with the hosted management application for the first network and a second interface to receive physical layer information from the devices deployed in the first network.

16. The system of claim 11, wherein the local agent running on the appliance is configured to automatically discover the devices deployed in the first network that include physical layer information data acquisition technology.

17. The system of claim 11, wherein the local agent running on the appliance is configured to automatically discover the hosted management application for the first network.

18. An appliance for use in a network maintained by an enterprise, the appliance comprising:
a programmable processor configured to execute software; and
a network interface configured to communicate over the network with devices included in the network that include physical layer information data acquisition technology to automatically capture physical layer information about cables used to make connections at the devices, wherein the appliance is a distinct component from the devices included in the network, wherein the network interface is further configured to communicate with a hosted management application associated with the network that is running on one or more servers maintained by a third party, the one or more servers not being a part of the network maintained by the enterprise;
wherein the software is configured to cause the appliance to receive at least some physical layer information from the devices included in the network, wherein the physical layer information is acquired by the physical layer information data acquisition technology included in the devices included in the network, wherein the software is further configured to cause the appliance to communicate at least some of the received physical layer information from the devices included in the network to the hosted management application associated with the network, wherein the appliance is configured to appear and function, from the perspective of the devices included in the network, as a management application that is locally deployed in the network.

19. The appliance of claim 18, wherein the physical layer information data acquisition technology comprises one or more of EEPROM-based technology, RFID technology, ninth wire technology, and inference-based technology.

20. The appliance of claim 18, wherein the software implements a first interface to communicate with the hosted management application associated with the network and a second interface to receive at least some physical layer information from the devices included in the network.

21. The appliance of claim 18, wherein the software is configured to automatically discover the devices included in the network that include physical layer information data acquisition technology.

22. The appliance of claim 18, wherein the software is configured to automatically discover the hosted management application associated with the network.

* * * * *